United States Patent
Ladin et al.

(10) Patent No.: US 7,949,989 B2
(45) Date of Patent: May 24, 2011

(54) METHODS, SYSTEMS AND COMPUTER PROGRAM PRODUCTS FOR LAYOUT DEVICE MATCHING DRIVEN BY A SCHEMATIC EDITOR

(75) Inventors: Karl L. Ladin, Rochester, MN (US); Erik S. Unterborn, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/147,169

(22) Filed: Jun. 26, 2008

(65) Prior Publication Data
US 2009/0327988 A1    Dec. 31, 2009

(51) Int. Cl.
*G06F 17/50*    (2006.01)
(52) U.S. Cl. .................. 716/139; 716/119
(58) Field of Classification Search .......... 716/5, 7, 716/11, 106, 119, 139
See application file for complete search history.

(56) References Cited

U.S. PATENT DOCUMENTS

| | | | |
|---|---|---|---|
| 6,762,757 B1 * | 7/2004 | Sander et al. | 345/420 |
| 6,768,486 B1 * | 7/2004 | Szabo et al. | 345/420 |
| 7,275,063 B2 * | 9/2007 | Horn | 1/1 |
| 7,555,739 B1 * | 6/2009 | Ginetti et al. | 716/119 |

* cited by examiner

*Primary Examiner* — Sun J Lin
(74) *Attorney, Agent, or Firm* — Cantor Colburn LLP (57) ABSTRACT

Systems and computer program products for layout device matching driven by a schematic editor. Exemplary embodiments include identifying a master device in a circuit layout having at least transistors, the master device having property values including at least one of topology, name and device-type, identifying a cloned device linked to the master device, automatically propagating the property values to the cloned device, making changes to a design layout of the master device, including a change to the properties, and automatically propagating the changes to the design layout and the change to the properties of the master device to the cloned device.

1 Claim, 6 Drawing Sheets

| Instance Property Editor <2> | |
|---|---|
| OK  Cancel  Apply  Add  Delete  Modify | Help |
| name | N58 |
| libName | asic8sf |
| cellName | NFET |
| viewName | symbol |
| purpose | cell |
| status | firm |
| orient | R0 |
| mag | 1 |
| xy | (8.1875 8.0625) |
| Matched | N56 INV1.N1  Library.Circuit.Instance |
| numinst | 1 |
| PST | -1 |
| PW | 6.5 |
| ad | 6.629p |
| as | 2.785p |
| cap | 1.75f |
| dcap | 875a |
| gcap | 875a |
| l | 500n |
| pd | 8.471u |
| pnc | 1 |
| ps | 870.3n |
| scap | 87.5a |
| st | S |
| w | 6.5u |

FIG. 6

METHODS, SYSTEMS AND COMPUTER PROGRAM PRODUCTS FOR LAYOUT DEVICE MATCHING DRIVEN BY A SCHEMATIC EDITOR

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to layout device matching, and particularly to methods, systems and computer program products for layout device matching driven by a schematic editor.

2. Description of Background

Figure 1:
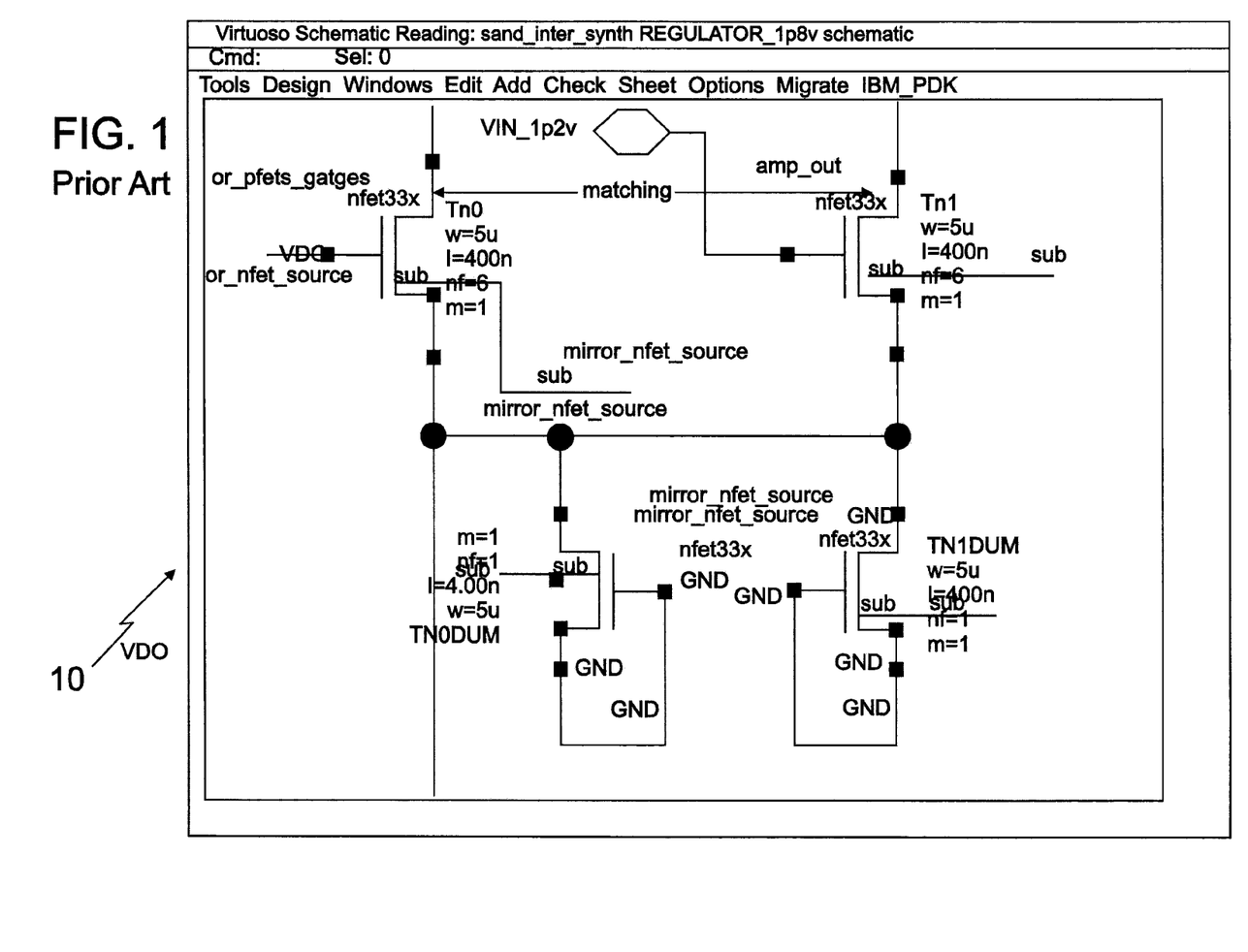
FIG. 1 illustrates a screenshot of a prior art schematic editor.

Critical circuits require that in the physical layout design that devices match (i.e. have identical layouts). (In a circuit layout some selected individual transistors have to have identical topology/dimensions to meet certain circuit requirements. They may be in pairs or many identical copies. (i.e., the transistors "match" each other.) In the schematic editor, no process exists to match device parameters (i.e. length, width, number of fingers) with one another. Currently, circuit designers indicate device matching by adding text or lines in the layout design. FIG. 1 illustrates a screenshot of a prior art schematic editor 10 having several lines of text over the layout design. Layout designers must rely on careful schematic inspection and good communication to make sure they "match" the correct devices with one another (i.e., pairs or many copies). Ensuring matching devices in a layout editor are done to circuit designer's specifications is currently something that must be done manually. Schematic design and layout design have no good way to effectively handle the "matching devices" flow.

SUMMARY OF THE INVENTION

Exemplary embodiments include a method for layout device matching driven by a schematic editor, the method including identifying a master device in a circuit layout having at least transistors, the master device having property values including at least one of topology, name and device-type, identifying a cloned device linked to the master device, automatically propagating the property values to the cloned device, making changes to a design layout of the master device, including a change to the properties, automatically propagating the changes to the design layout and the change to the properties of the master device to the cloned device, identifying one or more additional cloned devices to which the property values and changes to the design layout of the master device are propagated, checking for changes in the cloned device and the one or more additional cloned devices that are to be matched among the cloned device and the one or more additional cloned devices and in response to an attempt to make changes to the cloned device and the one or more additional cloned devices, preventing the changes being made to the cloned device, wherein the properties are stored in schematic libraries having one or more schematic pages.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides methods, systems and computer program products with the ability to provide a linked method rather than a nested model. A nested model is a collection of data, which forms an element, that that can be added to another data model. As such, the methods, systems and computer program products described herein do not add extra models and nesting layers in libraries. In addition, the methods, systems and computer program products described herein have the ability to easily determine "Master" and "Cloned" devices. A master device would be the prime element. "Clone" devices would be copies of the prime or "master". The master device propagates its property variables to the clones. In addition, the methods, systems and computer program products described herein are easily handled by circuit designer, and there is no need to create a model, just modify a property. In the schematic data model each element has property values. These properties can describe things like name, topology dimensions, and device type. The property described herein causes the master element to propagate its property values to other selected elements (e.g., clones).

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the methods, systems and computer program products described herein link two or more devices on a silicon chip and ensure matching between the devices. In exemplary embodiments, a design engineer specifies that the two or more devices (e.g., FETs, resistors, capacitors) are to match. Matching can be enforced in a backend check to ensure that all devices of the two or more devices match. Matching may also be enforced during manual layout. For example, if a layout person changes a first device in the two or more devices, the layout person is informed that other devices in the two or more devices must be similarly changed, with checking done to make sure that the other devices are indeed also changed to match the first device. As described above, currently, engineers only have visual inspection to ensure that their designs contain matching devices have been laid out (matched) correctly. In exemplary embodiments, the methods, systems and computer program products described herein implement a matching property. The matching property forces the value of the Master's other properties upon the devices that are listed in the new property value "Matched", which forces all property values on the Master to each Clone device named in the Master "Matched" property value. As such, the matching property links components and their values (i.e. length, width, Number of fingers). In exemplary embodiments, the methods, systems and computer program products described herein rely on the layout designer to use Pcell or Device generators that automatically create shapes for device layout. (Layout designers create shapes that ultimately become the VSLI mask shapes that are processed to become a finished chip. Automation routines (e.g., Pcell or Device Generators) exist to assist the layout designer to quickly create complex shapes for simple devices (e.g., transistors) or more complex circuit functions (e.g., AND, OR, . . . ). These routines get their inputs from the schematic to generate devices or block topologies.

In exemplary embodiments, the methods, systems and computer program products described herein link the devices together. The property value causes the application to link device values. This could be the same data structure as a data base pointer. In exemplary embodiments, the devices can be linked not only in each circuit schematic, but also in other schematics. In exemplary embodiments, the methods, systems and computer program products described herein causes all device properties to be copied from the original to each device that is linked to the original device. As described above, one device is be deemed the "master" and the other is deemed the "clone". Other devices that are linked to this master will have the identical layout properties.

Figure 2:
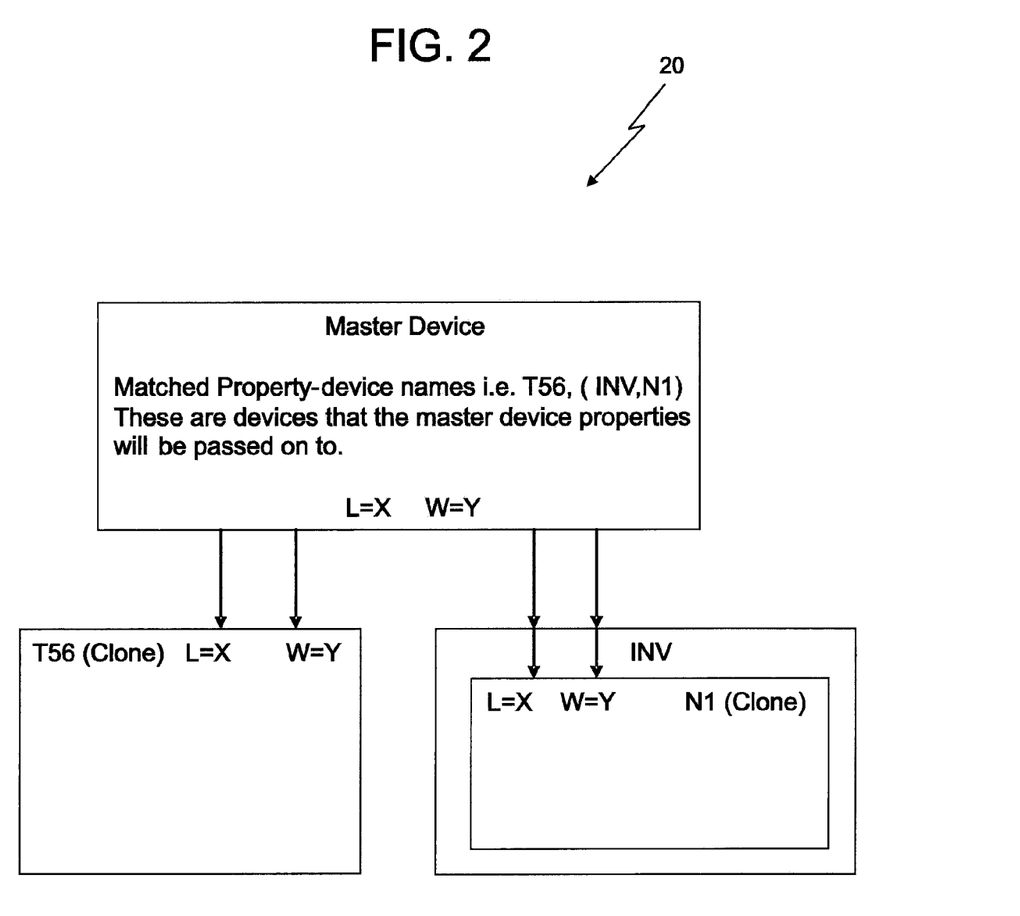
FIG. 2 illustrates a block diagram of an example of an exemplary master/clone relationship.

In exemplary embodiments properties in the Clone are linked to the Master Values. The Clone can't be changed. If the values in the Master are changed then those "linked" values are also immediately changed in the clone. For example, if the variable L in the Master is changed from X to XX then any devices that are clones (i.e. Matched property value) that value also changes. FIG. 2 illustrates a block diagram of an example of an exemplary master/clone relationship.

Figure 3:
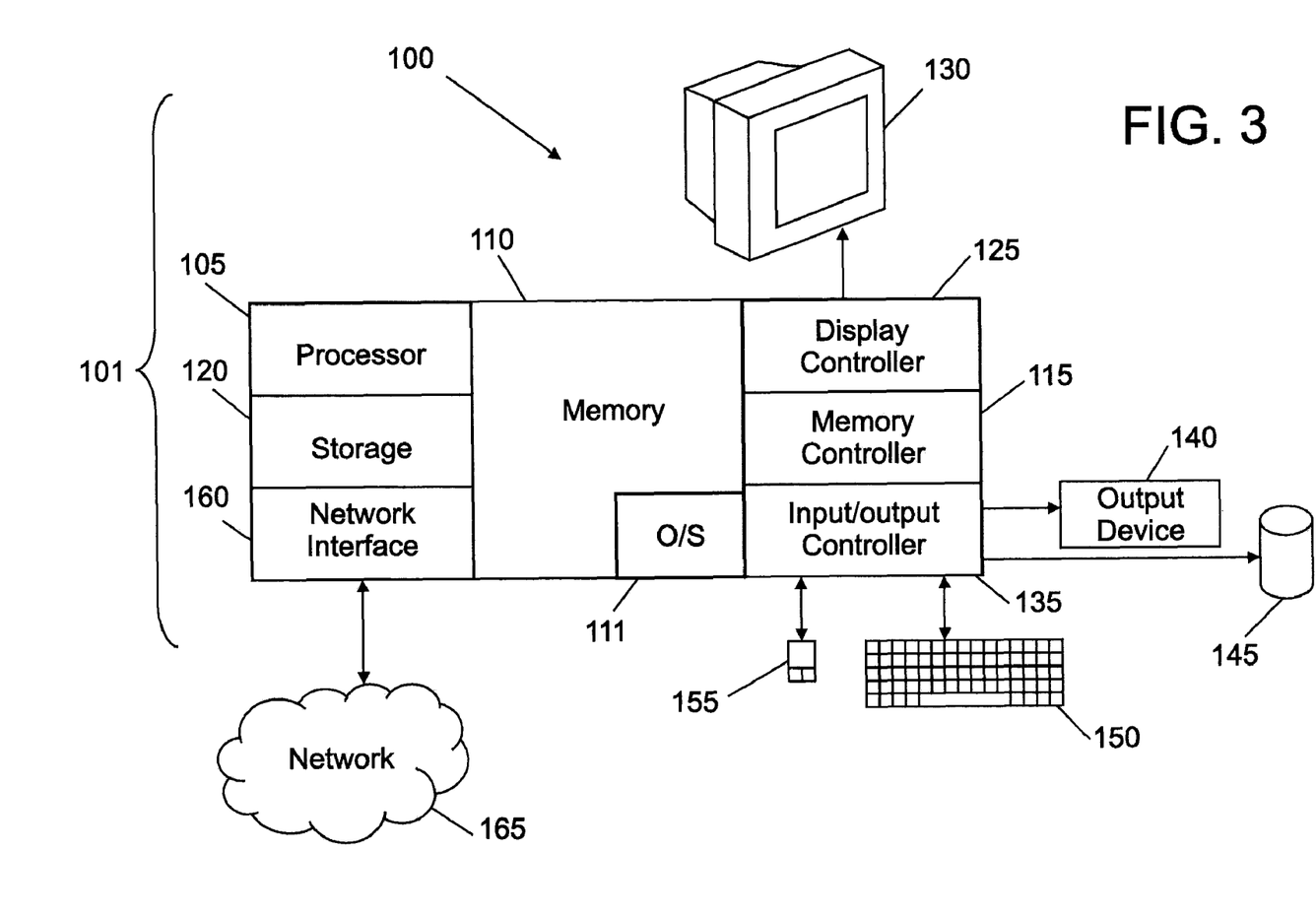
FIG. 3 illustrates an exemplary embodiment of a system for layout device matching driven by a schematic editor.

FIG. 3 illustrates an exemplary embodiment of a system 100 for layout device matching driven by a schematic editor. In exemplary embodiments, the exemplary user interfaces described herein can be implemented on the system 100. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 3, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes the schematic editor layout device matching methods described herein in accordance with exemplary embodiments and a suitable operating system (OS) 111. The operating system 111 essentially controls the execution of other computer programs, such the schematic editor layout device matching systems and methods described herein, and provides scheduling, input-output control, file and data management, memory management, and communication control and related services.

The schematic editor layout device matching methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the schematic editor layout device matching methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The schematic editor layout device matching methods described herein and the OS 111, in whole or in part, but typically the latter, are read by the processor 105, perhaps buffered within the processor 105, and then executed.

When the systems and methods described herein are implemented in software, as is shown in FIG. 3, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The schematic editor layout device matching methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the schematic editor layout device matching methods are implemented in hardware, the schematic editor layout device matching methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, the methods, systems and computer program products described herein generate a schematic device property that links device properties from a master device to unlimited "cloned" devices. The linked (cloned) devices could be in the same schematic or the same library or even outside the current library. In exemplary embodiments, schematic libraries are grouped to make the data manageable. They can be collections of circuit types or functions, which can be utilized on a single schematic page, between two pages in the same library or even between pages in different libraries.

Figure 4:
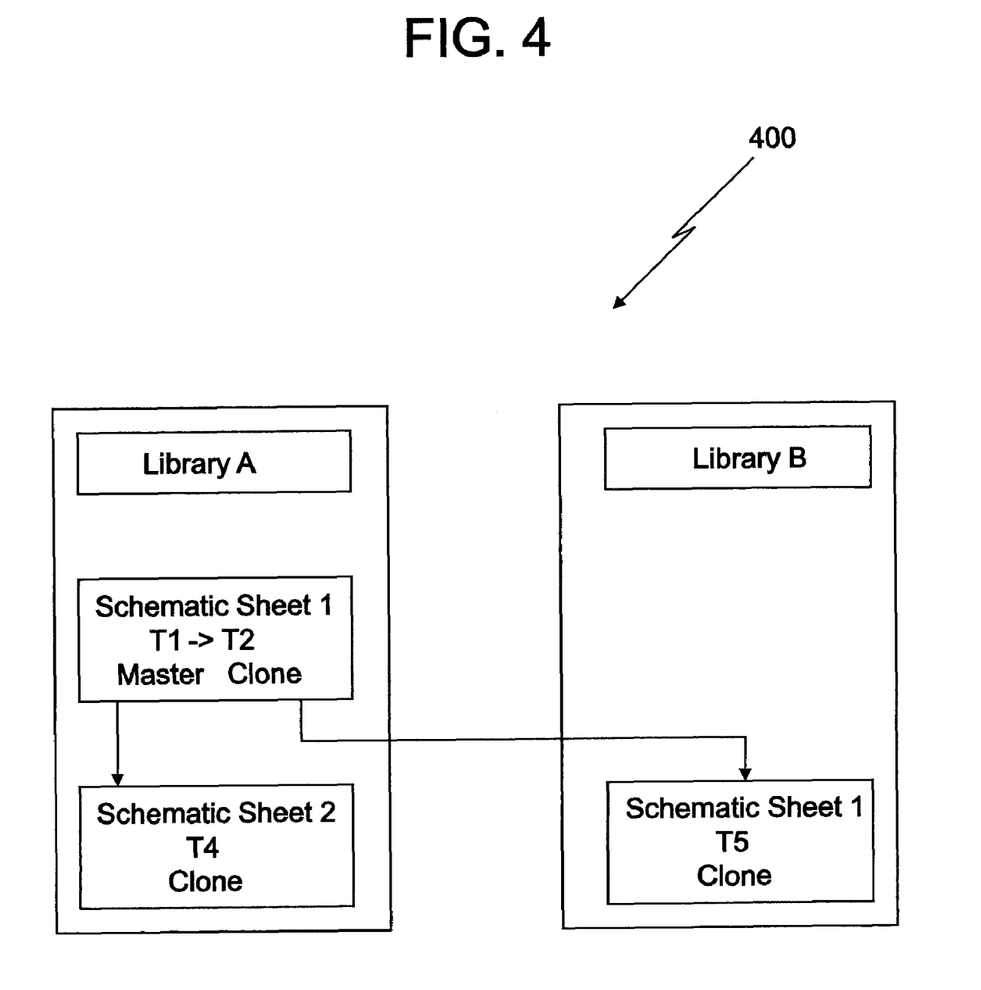
FIG. 4 illustrates a block diagram two libraries in accordance with exemplary embodiments.

FIG. 4 illustrates a block diagram 400 two libraries in accordance with exemplary embodiments. It is appreciated that the number of libraries could be limitless. In the present example, Library A, Schematic Sheet 1, Instance T1 is defined as the "Master". The clones are illustrated as: T2 in the same schematic sheet; T4 in schematic sheet 2, same library (Library A); and T5 in schematic sheet 1, different library (Library B).

Figure 5:
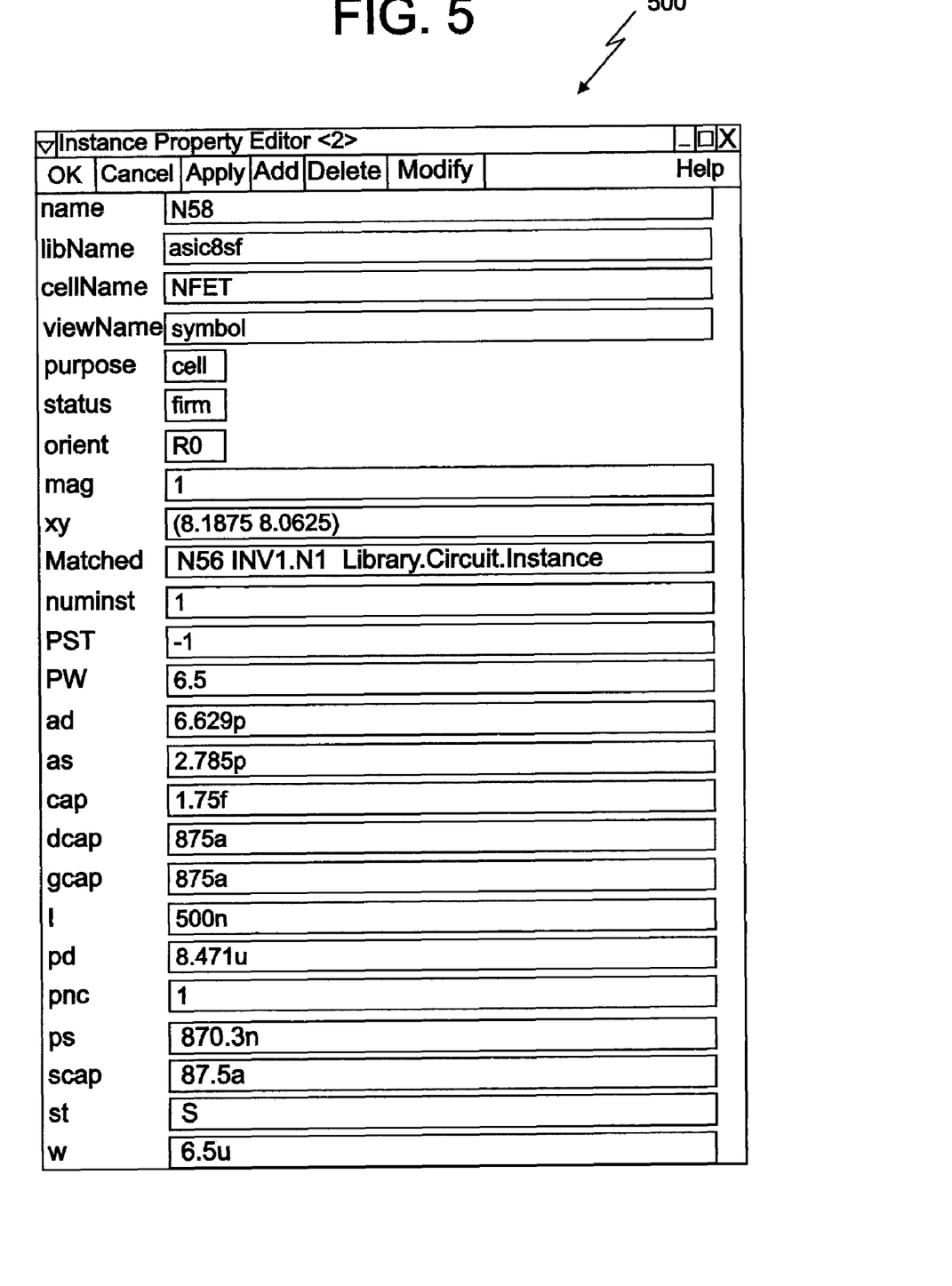
FIG. 5 illustrates a screenshot of a schematic editor in accordance with exemplary embodiments.

FIG. 5 illustrates a screenshot 500 of a schematic editor in accordance with exemplary embodiments. In exemplary embodiments, with the exception of the "Matched" property, all the other properties are on the base device (i.e., all the properties come from the base model). In exemplary embodiments, when device names are in the "Matched" field, the property values are then linked from each "clone" or "Matched" device(s) to values in the "master". In addition, the libName, cellName and viewName must match each device in the "Matched" field. In exemplary embodiments, the matched devices must be of the same type. In addition, the property "Matched" is just a possible name of the property. The property could be anything that indicates that to the user that this property is used to match devices. In exemplary embodiments, if the master is changed then the user could be notified instantly of what "cloned" devices would be affected. Using this feature would ensure that layout being generated by Pcell or circuit generators would much more likely be matched.

Figure 6:
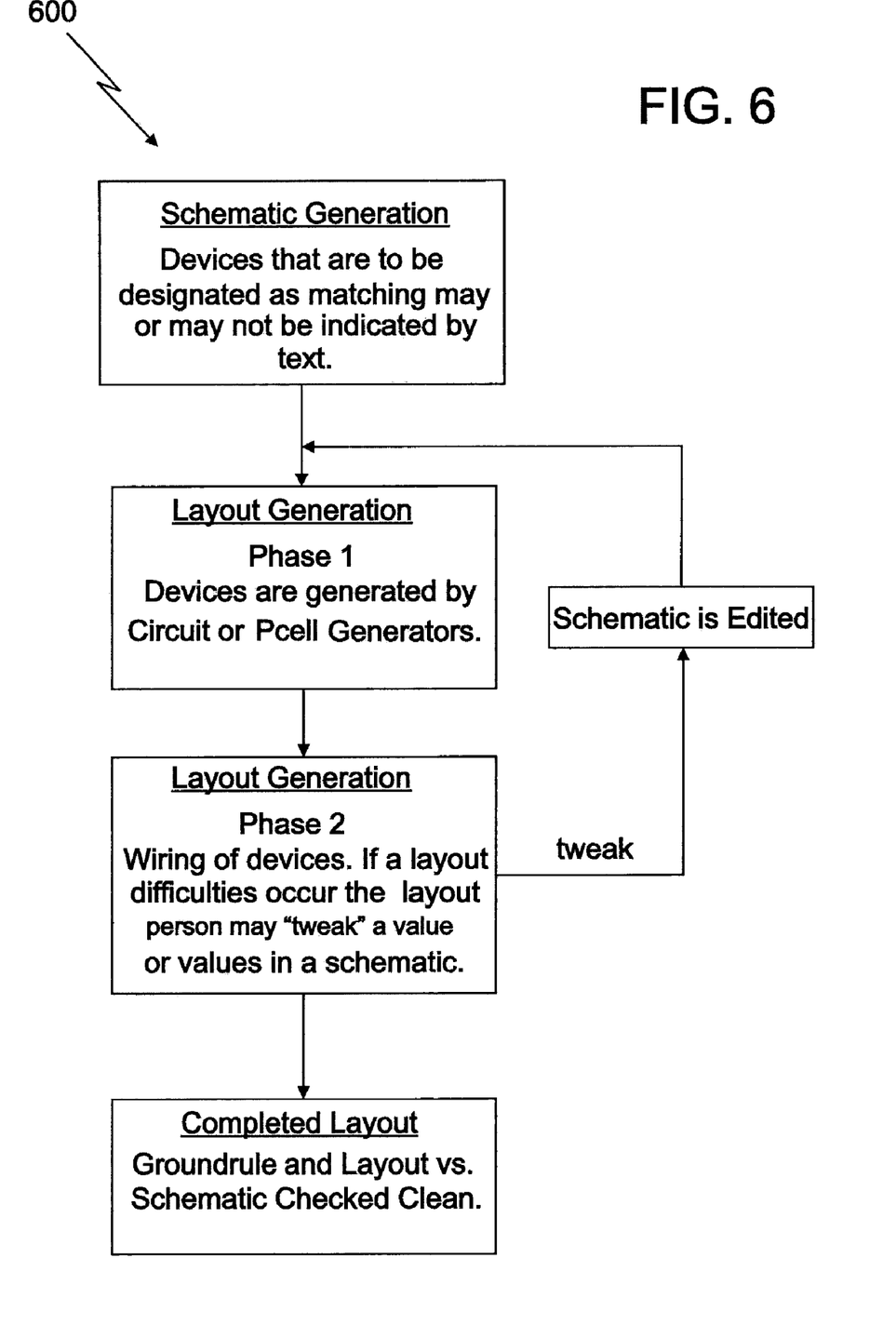
FIG. 6 illustrates a flow chart of a method for layout device matching driven by a schematic editor in accordance with exemplary embodiments.

FIG. 6 illustrates a flow chart of a method 600 for layout device matching driven by a schematic editor in accordance with exemplary embodiments. In exemplary embodiments, a layout person may change a single device properties, but may fail to change the device that is supposed to Match. (i.e. number of fingers). The method 600 illustrates the design flow from Schematic to Completed Layout. The Layout Generation Phase and "tweak" is where an error could be created by manipulating a device's properties slightly. The layout would pass LVS (Layout vs. Schematic checking) but would not be what the Circuit Designer intended. With the implementation of the feature as described herein, the Layout Designer would either change all the "linked" devices or he would know instantly that more than one device would be changed. LVS checkers typically check a subset of physical design geometries. One example is that a checker checks the length and width of a device but may not check the number of fingers. Device generators (e.g., Pcell in Cadence Virtuoso) create devices based on properties of the schematic. Since the Master/Clone devices are identical they would be exact duplicates. They would match as the circuit designer intended. In addition, if a user attempted to modify a "clone" device property the user would not be permitted. Conversely, if the user attempted to modify an editable "master" device they would be warned that they were editing a master and it could indicate which "clone" devices would also be affected.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for layout device matching driven by a schematic editor, the method consisting of:
   implementing a processor to:
   identify a master device in a circuit layout having at least transistors, the master device having property values including at least one of topology, name and device-type;
   identify a cloned device linked to the master device;
   automatically propagat the property values to the cloned device;
   make changes to a design layout of the master device, including a change to the property values;
   automatically propagate the changes to the design layout and the change to the property values of the master device to the cloned device;
   identify one or more additional cloned devices to which the property values and the changes to the design layout of the master device are propagated;
   check for changes in the cloned device and the one or more additional cloned devices that are to be matched among the cloned device and the one or more additional cloned devices; and
   in response to an attempt to make changes to the cloned device and the one or more additional cloned devices, prevent the changes being made to the cloned device and the one or more additional cloned devices,
   wherein the property values are stored in schematic libraries having one or more schematic pages.

* * * * *